United States Patent
Zechmann et al.

(10) Patent No.: US 6,439,675 B1
(45) Date of Patent: Aug. 27, 2002

(54) METHOD AND DEVICE FOR CONTROLLING A BRAKING SYSTEM

(75) Inventors: Juergen Zechmann, Heilbronn; Albrecht Irion, Stuttgart; Eberhard Holl, Vaihingen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/688,577

(22) Filed: Oct. 16, 2000

(30) Foreign Application Priority Data

Oct. 16, 1999 (DE) .......................... 199 50 034

(51) Int. Cl.⁷ ................................ B60T 7/12

(52) U.S. Cl. ...................................... 303/191

(58) Field of Search .................. 192/13 A; 188/353; 303/89, 125, 191

(56) References Cited

U.S. PATENT DOCUMENTS

| | | | | |
|---|---|---|---|---|
| 5,105,922 A | * | 4/1992 | Yant | 192/3.58 |
| 5,129,496 A | | 7/1992 | Sigl et al. | |
| 5,452,946 A | * | 9/1995 | Warner | 303/24.1 |
| 6,009,984 A | * | 1/2000 | Zechmann et al. | 188/353 |
| 6,086,515 A | * | 7/2000 | Buschmann et al. | 303/191 |

FOREIGN PATENT DOCUMENTS

DE 196 21 628 12/1997

* cited by examiner

Primary Examiner—Christopher P. Schwartz
(74) Attorney, Agent, or Firm—Kenyon & Kenyon

(57) ABSTRACT

Proposed are a method and a device for controlling a braking system of a vehicle, braking force being maintained in at least one operating state at least one wheel of the vehicle while the braking pedal is actuated, independently of the degree of the pedal actuation. In this context, different conditions are provided jointly or alternatively for activating or deactivating the function.

10 Claims, 4 Drawing Sheets

METHOD AND DEVICE FOR CONTROLLING A BRAKING SYSTEM

FIELD OF THE INVENTION

The present invention relates to a method and a device for controlling the braking system of a vehicle.

BACKGROUND INFORMATION

European Patent No. 375 708 (corresponding to U.S. Pat. No. 5,129,496) describes the implementation of an automatic locking brake by suitably controlling a braking system. For that, when the brake pedal is actuated and when the vehicle fails to meet a very small speed value again, the braking pressure is locked up in at least one wheel brake, i.e., maintained constant, by switching at least one valve, and is possibly additionally increased by actuating a pressure-generating arrangement. The locked-up braking pressure is reduced again only when a desire of the driver to start off from rest is detected.

German Published Patent Application No. 196 21 628 describes an automatic locking brake function (=hillholder function) which is activated when the vehicle comes to a standstill while the service brake is actuated. The then prevailing braking pressure or braking force is maintained or built up at least one wheel brake independently of the degree of the actuation of the brake pedal, and is reduced again when the brake pedal is released. Such a hillholder function avoids extensive safety measures. To assist in starting off, for example, on uphill grades while the brake pedal and the clutch pedal are actuated concurrently, the clutch pedal takes over the activation or deactivation of the hillholder function in response to releasing the brake pedal. In systems without clutch pedals capable of being actuated by the driver, for example, in the case of automatic transmissions, no clutch pedal information exists so that the known method is not usable universally.

SUMMARY OF THE INVENTION

An object of the present invention is to specify measures for an automatic locking brake function which provides a starting-off aid without complex sensor mechanism and which is usable universally at the same time.

An automatic locking brake function or a hillholder function which maintains the braking force (locks up pressure) when the braking pedal is actuated and the vehicle is detected to stand still, which releases the braking force again in response to releasing the brake pedal (preferably, the function remains active for a certain time subsequent to releasing the pedal; after the time has elapsed or in response to detecting a desire to start off from rest, the braking force is released again), a universally usable starting-off aid is carried out, in particular on uphill grades. Advantageously, the vehicle does not roll backward. The driver receives a clearly reproducible behavior in which the release of the service brake, at intermediate term, results in an unbraked vehicle in any case, as the driver is used in vehicles without this additional electronic function as well.

In a particularly expedient manner, a misuse of the hillholder function as parking brake is not possible.

Furthermore, it is particularly advantageous that in a hydraulic braking system, only relatively low demands need to be placed on the pressure-holding capability of the valve which locks up the pressure. This is because the time interval during which the pressure differential is present across the valve is limited.

It is particular beneficial that it is guaranteed that, while the function is activated, the driver is ready and therefore able to take over the holding of the vehicle in the case of a fault.

It is particular expedient that the hillholder function makes do without complex sensor mechanism such as a driver-presence detection, and that it is usable universally, also with automated transmissions.

The mentioned conditions for activating and deactivating the hillholder function are advantageously accompanied by at least one further condition which improves the performance reliability of the hillholder in an advantageous manner. The specific period of time for which the maintaining of the braking force is extended while the accelerator pedal is actuated and the brake pedal is released, is rated in such a manner that, on uphill grades, the vehicle is held for as long as the maintained braking force is needed for starting off from rest. In this process, in an exemplary embodiment, a slight reduction in braking force or braking pressure is advantageously initiated already during this period of time. In the following, the latter will also be understood as "maintaining the braking force" or "locking up the braking pressure".

By the described conditions for activating or deactivating the hillholder, it is expediently guaranteed that the vehicle is automatically immobilized only if the driver is ready, i.e., if the driver has not left the vehicle. This is also true in connection with an automated transmission where clutch and/or gear information does not provide any information on the presence of the driver.

DETAILED DESCRIPTION

Figure 1:
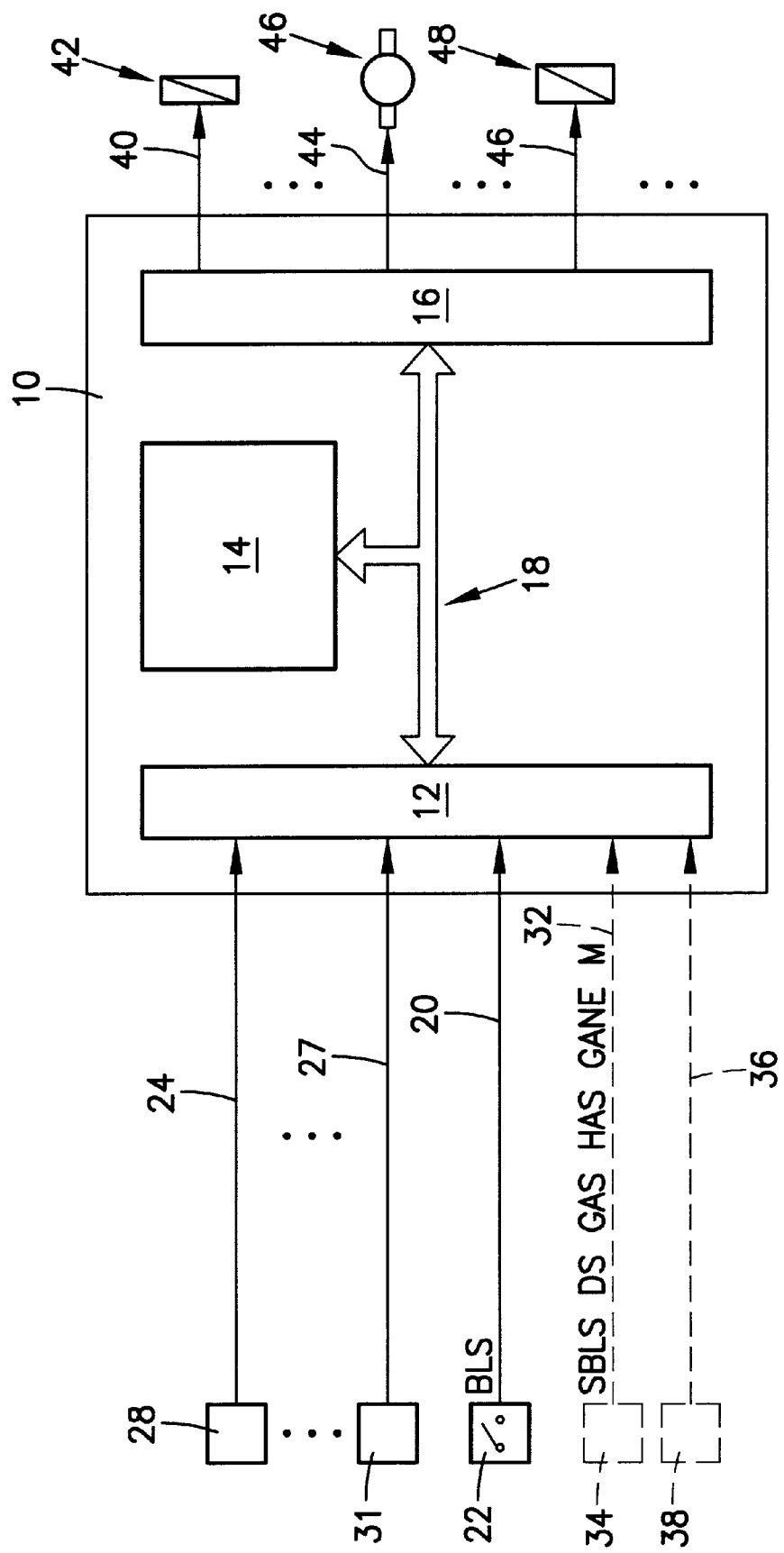
FIG. 1 shows a control device for the braking system of a vehicle.

FIG. 1 shows a control device 10 for controlling the braking system of a vehicle. This control device 10 includes an input circuit 12, at least one microcomputer 14, and an output circuit 16. Input circuit, microcomputer, and output circuit are interconnected for mutual data exchange via a communication system 18. Led to input circuit 12 are input lines from different measuring devices which, in a preferred embodiment, are combined in a bus system, for example, CAN. A first input line 20 leads from a brake pedal switch 22 to control unit 10, and communicates a brake pedal switch signal BLS thereto. Input lines 24 through 27 connect control unit 10 to wheel speed sensors 28 through 31 via which signals with regard to the speeds of the wheels of the vehicle are supplied. In a preferred embodiment, moreover, provision is made for at least one further input line 32 via which at least one of the following variables is transmitted: a second brake pedal switch signal sBLS providing redundant information on the brake pedal actuation; a measuring signal variable representing master brake cylinder pressure DS; an actuation quantity GAS of an accelerator pedal; or, from an engine management device, the information whether or not the accelerator pedal is actuated; a switch signal HAS which indicates that a parking brake is applied; from an automatic transmission control, a variable GANG is supplied which provides information on an engaged gear stage; from an engine management, a variable M which represents a measure for the engine torque which is set or to be set. Inside the control unit, marks are set which represent the status of an anti-lock controller ABS and/or of a traction controller ASR and/or of a driving dynamics controller ESP. In an advantageous exemplary embodiment, moreover, provision is made for a further input line 36 which leads from a driver-operable momentary contact switch 38 to control unit 10, the driver activating the hillholder function when actuating the contact switch.

At output circuit 16 of control unit 10, output lines are mounted which drive control elements for controlling the wheel brakes of the vehicle. In the preferred exemplary embodiment, the braking system is a hydraulic braking system so that output lines 40 lead to valves 42 for controlling the braking pressure in the individual wheel brakes, whereas possibly, at least one pressure-generating device 46 (pump) is controlled via output lines 44 for the individual brake circuits. In a preferred embodiment, at least one control valve 48, which maintains the braking pressure constant in at least one wheel brake along the lines of the described hillholder function when the brake pedal is actuated, is triggered via output line 46. In the preferred exemplary embodiment, this valve is at least one control valve, the switch-over valve which is provided for carrying the out traction control, and which interrupts the connection between master brake cylinder and wheel brakes. In lieu of this valve, the braking pressure is also locked up by the valves which control the wheel braking pressure. Depending on the embodiment, the braking pressure is locked up at all or at selected wheel brakes.

The present invention is not limited to the use in a specific type of braking system. Thus, the design approach in hydraulic braking systems is also used with the corresponding advantages in pneumatic braking systems or in conjunction with electrohydraulic, electromotive and/or electropneumatic braking systems. In the process, the braking force which is input by the driver via brake pedal actuation and which is adjusted via conventional pressure lines or by an electrical arrangement is maintained at specific values or increased at individual wheel brakes while the hillholder function is active, switching valves and possibly pumps and/or maintaining control signals constant or switching control signals to specific values. In particular in the case of electromotive braking systems, the electromotive brake controller is driven to exert a specific braking force or locked up in a preselected position by electric control signals.

In a preferred embodiment, control device 10, in that case microcomputer 14, carries out at least a traction control and, possibly additionally, a driving dynamics control, while controlling the braking system of the vehicle. Closed-loop controls of that kind are known from the related art. Provided as an additional function is, moreover, a so-called hillholder function which, in addition to a locking-brake effect, is also used as hill-start aid for manual transmission vehicles and as creep suppression for automatic transmission vehicles. When working with such a hillholder function, in principle, the braking force (brake application force) input by the driver is retained in response to a signal, using a corresponding control element control (in particular the traction control switch-over valves), and is reduced again in specific conditions. The request signal for the hillholder function can be derived, for example, from a driver-operable momentary contact switch or from an automatic vehicle standstill detection, an example of such a vehicle standstill detection being known from the related art mentioned at the outset.

The activation and/or deactivation of the automatic locking brake (hillholder) is derived from at least one of the mentioned input variables. The conditions mentioned below are used either individually or in an arbitrary combination, depending on the execution.

The activation of the function takes place when the vehicle has come a standstill (detection via speed sensors or within the scope of an estimation as described in the related art), when the function is ready (this is the case either always or only upon the actuation of a control switch by the driver), and when the brake is depressed. In addition to these three main conditions, provision can be made for at least one of the following conditions, depending on the design: the drive engine of the vehicle is to be in operation, which is derived by a corresponding mark set in the memory of the control unit or on the basis of an engine speed signal; the accelerator pedal is not actuated, which is determined by communication of a corresponding information or by communication of an actuation quantity for the accelerator pedal which is compared to a minimum threshold value; a gear is to be engaged, in the preferred exemplary embodiment a corresponding mark being emitted by the transmission control; a master brake cylinder pressure is to have been built up above a specific threshold value, the read-in master brake cylinder pressure being compared to the threshold value; the road gradient in the start-off direction is to be positive, i.e., the vehicle is to start off from rest on an uphill grade, which is estimated on the basis of a gradient sensor and/or according to other variables; the parking brake is not applied which is detected using a corresponding switch information.

The last condition prevents the hillholder from being misused as parking brake. If the driver, for example, applies the parking brake only weakly and leaves the vehicle, then, since the hillholder is deactivated by applying the parking brake (see below), the driver recognizes that the vehicle cannot be held via the application of the parking brake.

When the hillholder is deactivated, the locked-up pressure is reduced abruptly, in a stepped manner, or continuously by partially or completely opening the valves that lock up the pressure. Accordingly, the maintained braking force is reduced by outputting corresponding control signals to the brake controllers.

The deactivation takes place when at least one of the following conditions exists: a desire to start off from rest is detected when the communicated signal representing the engine torque or when the engine speed exceed a threshold value, the measured or estimated information regarding the road gradient possibly entering into the determination of the threshold value to provide an improved starting-off comfort, and, possibly, if the clutch is not opened; a certain period of time has elapsed subsequent to the release of the brake pedal; the vehicular speed is greater than a threshold value; the hand brake (or a parking brake which can be operated via the foot) is applied, which, in an exemplary embodiment is taken into account only subsequent to the release of the brake to prevent pedal reactions; a certain period of time has elapsed after a preselected master brake cylinder pressure threshold value has failed to be met again.

In the deactivation, the period of time from the release of the brake pedal until the actual starting-off process is bridged over, and the vehicle is prevented from rolling backward while starting off from rest on uphill grades since the braking force, i.e., the locked-up braking pressure is still retained for a short period of time (approximately 1 sec) or reduced in a delayed manner subsequent to the release of the brake pedal.

To further improve the starting-off process, provision is made for the accelerator pedal to be depressed while a desire to start off from rest does not yet exist so as to extend the holding time. In this case, provision is made for the holding time to be extended (for example to 3 sec) subsequent to the release of the brake pedal. The holding time subsequent to the release of the brake pedal is fixed with a view to a clear vehicle behavior, it being required that getting off subsequent to the release of the brake pedal be impossible while the function is active. Therefore, in a timid starting-off process, it is not always guaranteed that this holding time is sufficiently large enough to avoid rolling backward. It is extended if the accelerator pedal is depressed so that the deactivation of the function takes place subsequent to a longer holding time duration if no desire to start off from rest has been detected (engine torque is not yet sufficient).

As an alternative to these conditions for activating and deactivating the hillholder, provision is also made for the function to be temporarily switched to passive mode, a successive approach to an obstacle during downhill travel being facilitated. If the function were active in this state, one would either have to accelerate, which would not facilitate the approach to the obstacle, or to wait for the time condition which constitutes a loss of comfort. The system is switched to passive mode preferably by a driver-operable switching signal, or in response to a detected downhill travel (for example, on the basis of the ascertained road gradient).

In the preferred exemplary embodiment, the described procedure is implemented as a program of arithmetic unit 14 of control unit 10. An example for such a program is shown in FIGS. 2 and 3 as flow diagrams with respect to the activation and the deactivation of the function.

Figure 2:
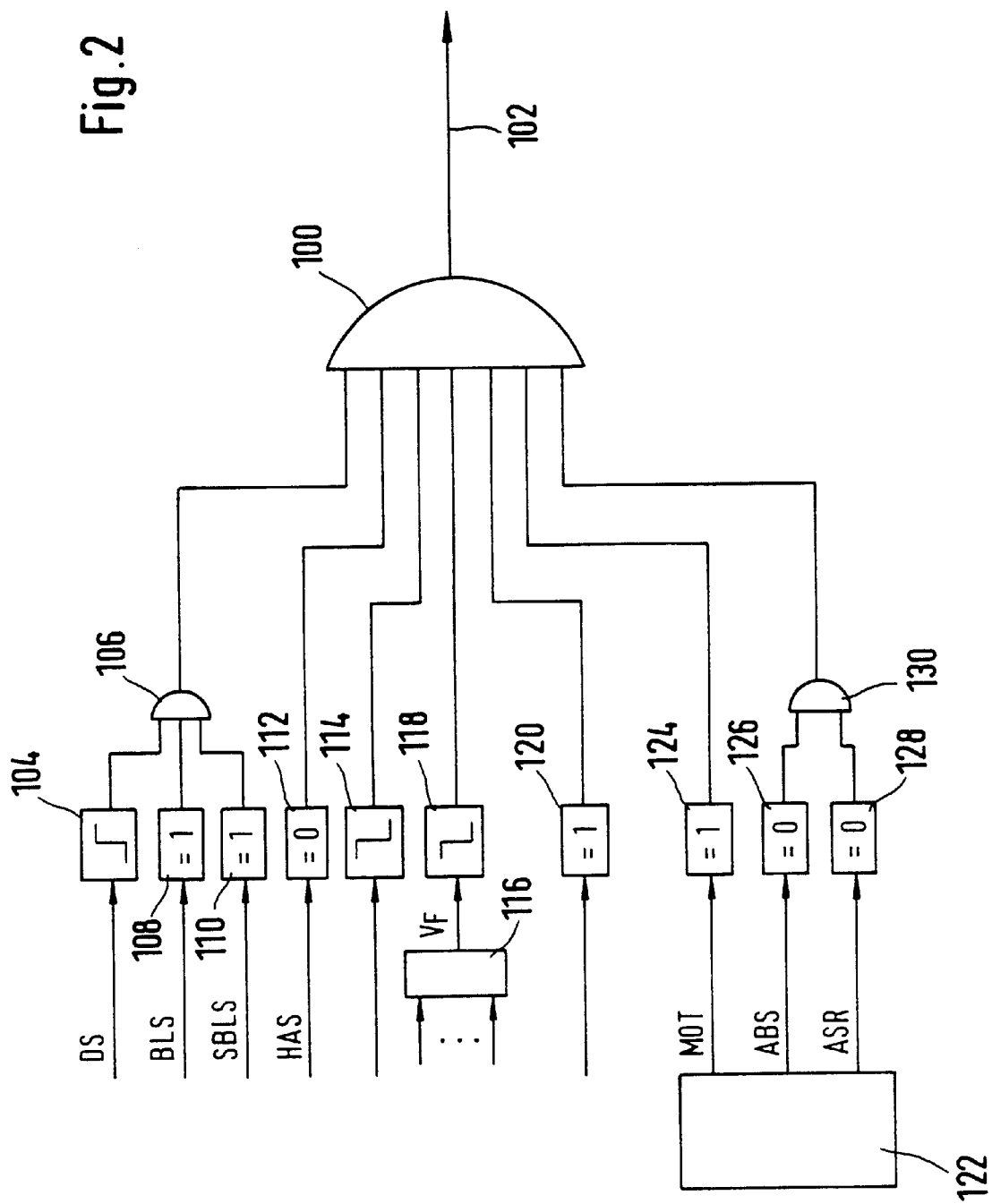
FIG. 2 shows the interrelations during the activation.
Figure 3:
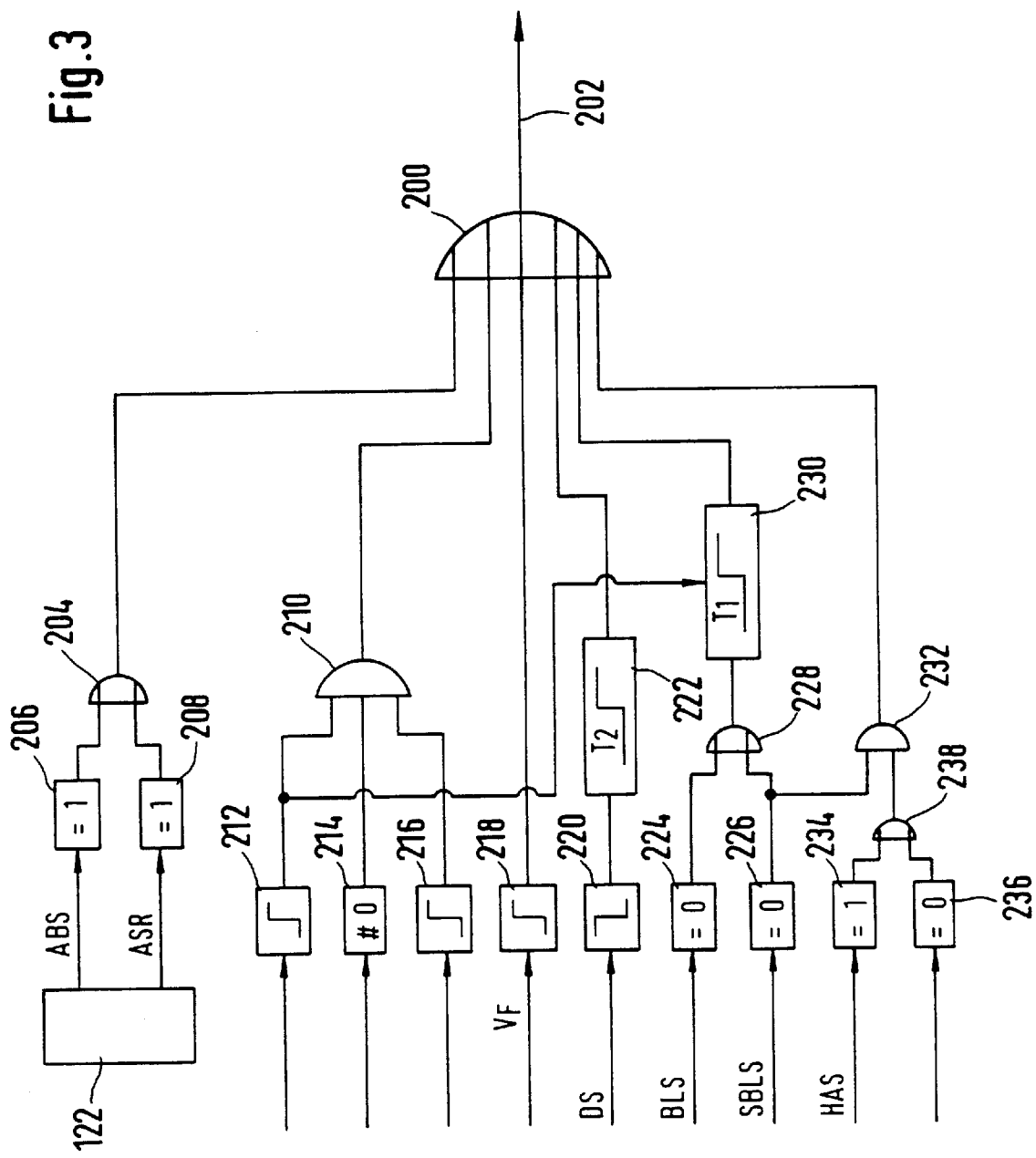
FIG. 3 shows those during the deactivation of the hillholder or of the automatic locking brake function as flow diagrams.
Figure 4A:
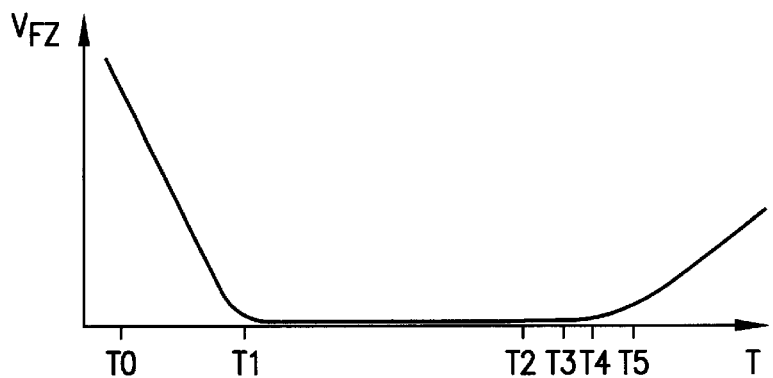
FIG. 4a shows a first timing diagram explaining the method of functioning.
Figure 4B:
FIG. 4b shows a second timing diagram explaining the method of functioning.
Figure 4C:
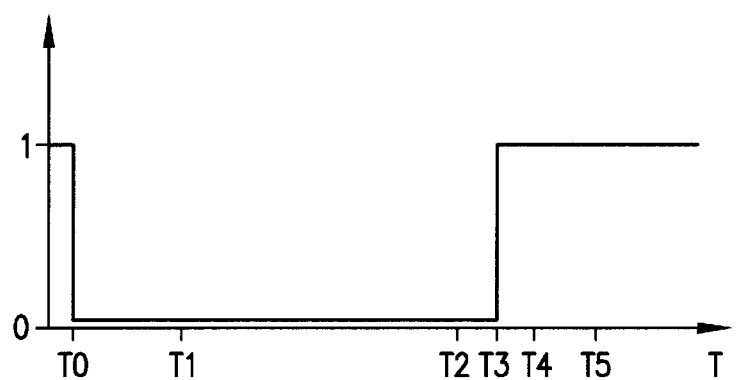
FIG. 4c shows a third timing diagram explaining the method of functioning.
Figure 4D:
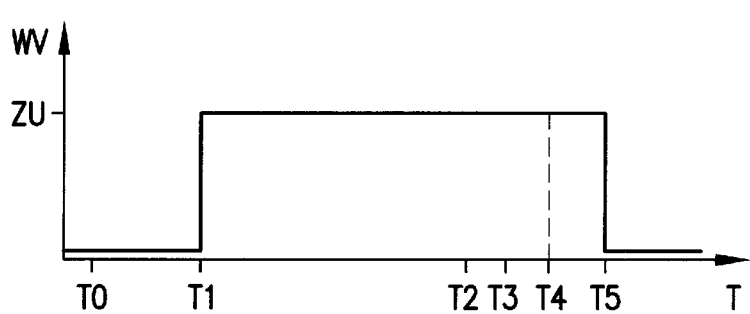
FIG. 4d shows a fourth timing diagram explaining the method of functioning.

FIG. 2 shows the procedure for activating the hillholder function. The activation signal is generated by an AND connection 100 and output as an output signal via a line 102 for closing a valve or alternative control elements. The input signals of AND connection 100 are generated as described in the following: in a comparator 104, master brake cylinder pressure signal DS is compared to a threshold value representing an actuated brake pedal, and an output signal is output if the signal exceeds this threshold value. This output signal is fed to an AND connection 106. In a comparator 108, brake pedal switch signal BLS is compared to value 1, the brake pedal switch signal having value 1 if the brake pedal is actuated. This output signal is also fed to AND connection 106. In a corresponding manner, the signal of safety brake pedal switch sBLS is compared to value 1 in a comparator 110; if this signal has value 1 (actuated pedal), a signal is output and fed to AND connection 106. The output signal of AND connection 106 constitutes an input signal of AND connection 100. A hand brake switch signal HAS is compared to value zero in a comparator 112. This value occurs when the hand brake is not actuated. If the signal has value zero, then an output signal is emitted to AND connection 100. Furthermore, a gas actuation quantity GAS is supplied and compared to a preselected threshold value in a threshold value stage 114, a released accelerator pedal being detected when the gas actuation quantity falls bellow the threshold value. If this is the case, an output signal is emitted to AND connection 100. Moreover, vehicular speed VF is estimated in an estimation stage 116, for example, on the basis of wheel speeds VRAD, as is described in the related art mentioned at the outset. In a threshold value stage 118, this vehicular speed is compared to a minimum value, a standstill of the vehicle being indicated when the vehicular speed falls below the minimum value. If this is the case, an output signal is generated as an input signal for AND connection 100. Moreover, a transmission information GANG communicated by a transmission control is compared to value I in comparator 120. This value represents an engaged gear stage. If this value exists, an output signal is sent to AND connection 100. Moreover, status marks are stored in a memory element 122. A first status mark MOT indicates whether the drive unit of the vehicle is running. In comparator 124, this mark is compared to value 1. If this value is present (engine running), an output signal is output for AND connection 100. Furthermore, status marks are provided for the ABS- and TCS-functions, possibly also for the ESP function, the status marks exhibiting zero when the corresponding function is not active. In comparators 126 and 128, the status marks are compared to value zero in a corresponding manner. If both marks exhibit value zero (AND connection 130), an output signal is communicated to AND connection 100.

The latter generates an output signal for activating the braking pressure lockup when input variables are present at all inputs, i.e., when all mentioned conditions are fulfilled.

The representation in FIG. 2 depicts a preferred exemplary embodiment. In other exemplary embodiments, the activation conditions are used in another, arbitrary combination, as described above.

The procedure for deactivating the automatic locking brake is carried out in a corresponding manner. A corresponding flow diagram is shown in FIG. 3, a deactivation generally being carried out if one of the conditions does not exist.

The central element of this flow diagram is an OR connection 200 which, via line 202, emits an output signal which deactivates the braking pressure lockup if an input signal is present at least one of the its inputs. A first input signal is generated in OR connection 204 if one of the status marks read out from memory 122 exhibits value 1 for the anti-lock controller and for the traction controller (see comparators 206, 208). A second input variable is generated using an AND connection 210, this input variable representing the driver's desire to start off from rest which is generated if the accelerator pedal actuation quantity exceeds a preselected threshold value (threshold value stage 212), a clutch signal KUP represents a non-opened clutch (comparator 214), and a value MSOLL representing the torque of the drive unit exceeds a preselected threshold value (threshold value stage 216). A third input signal is generated if vehicular speed VF exceeds a preselected threshold value (threshold value stage 218). A fourth input signal of OR connection 200 is generated if master brake cylinder pressure DS falls below a preselected threshold value (threshold value stage 220), and this threshold value is exceeded for a preselected period of time T1 (time-delay stage 222). A fifth input signal of OR connection 200 is generated if either brake pedal switch BLS or safety switch sBLS represent a non-activated pedal (value in each case zero, see comparators 224, 226, and OR connection 228), and a specific period of time T2 has elapsed (time-delay stage 230) subsequent to the detection of a released pedal on the basis of at least one of these switch signals. Period of time T1 is smaller than period of time T2. In this context, period of time T2 of time-delay stage 230 is extended if an actuation of the accelerator pedal is detected in threshold value stage 212. A last input signal is generated by AND connection 232 if one of the brake pedal switch signals (preferably signal sBLS) indicates a released brake pedal and the hand brake is applied (cf. comparator 234), or if no gear is engaged (cf. comparator 236 and OR connection 238). If one of the input variables is present at OR connection 200, the braking pressure lockup is released.

The method of operation of the described procedure is illustrated on the basis of the timing diagrams of FIG. 4. FIG. 4a shows the time characteristic of the vehicular speed, FIG. 4b shows that of a brake pedal switch signal, FIG. 4c shows the status of the accelerator pedal (actuated, non-actuated), and FIG. 4d shows the status of the switch-over valve (open, closed). At instant T0, the driver actuates the brake pedal (cf. FIG. 4b) and releases the accelerator pedal (FIG. 4c). At this instant, the switch-over valve is open (FIG. 4b). The vehicular speed decreases until instant T1, the standstill of the vehicle being detected at instant T1, which, according to FIG. 4d, results in the triggering of the switch-over valve in the case that the brake pedal is actuated and the accelerator pedal is released (FIG. 4d). The braking pressure is locked up. At instant T2, the driver releases the braking pedal for the purpose of starting off (FIG. 4b), at instant T3, the driver actuates the accelerator pedal (FIG. 4c). If the accelerator pedal were not actuated, this would result in opening the switch-over valve at instant T4 (preselected period of time from T3). This period of time is extended by the actuated accelerator pedal so that the switch-over valve is opened only at instant T5 (FIG. 4d). In this manner, starting off from rest is supported according to FIG. 4a even in the case of a starting-off process which is carried out in a timid manner, i.e., without detection of a starting-off process.

The above-mentioned conditions for activating and/or deactivating the hillholder function are used either individually or in an arbitrary combination, depending on the exemplary embodiment.

What is claimed is:

1. A method for controlling a braking system of a vehicle, comprising the steps of:
    maintaining a braking force in at least one operating state at least one wheel of the vehicle while a braking pedal is actuated, independently of a degree of a brake pedal actuation; and
    performing at least one of the steps of:
        reducing the braking force after a first specific time if the brake pedal is no longer actuated,
        reducing the braking force after a second specific time if an accelerator pedal is actuated subsequent to a release of the brake,
        reducing the braking force when a preselected time elapses after a master brake cylinder pressure falls below a preselected threshold value,
        reducing the braking force when one of an anti-lock controller, a traction controller, and a driving dynamics controller is active, and
        reducing the braking force if no gear is engaged when the braking pedal is released.

2. The method according to claim 1, wherein:
    the step of reducing the braking force if the parking brake is applied is performed when the brake pedal is no longer actuated.

3. The method according to claim 1, further comprising the step of:
    immediately reducing the braking force when a respective condition occurs.

4. The method according to claim 1, further comprising the step of:
    reducing the braking force when a desire to start-off from rest is detected on the basis of at least one of an actuation of the accelerator pedal, a clutch status, an engine torque, and an engine speed.

5. The method according to claim 4, wherein:
    the step of reducing the braking force when the desire to start-off is detected takes into account at least one of a road gradient and the engine speed when the engine speed exceeds a minimum value.

6. A method for controlling a braking system of a vehicle, comprising the steps of:
    maintaining a braking force in at least one operating state at least one wheel of the vehicle while a braking pedal is actuated, independently of a degree of a pedal actuation;
    reducing the braking force again when at least one condition exists; and
    maintaining the braking force if at least one of the following conditions exists:
        a gear is engaged,
        at least one of a traction controller, an anti-lock controller, and a driving dynamics controller are not active,
        a road gradient in a start-off direction is detected as being positive, and
        an accelerator pedal is not actuated.

7. A device for controlling a braking system of a vehicle, comprising:
    a control unit for emitting at least one output signal in at least one operating state while a brake pedal is actuated, the at least one output signal maintaining a braking force at least one wheel of the vehicle, independently of a degree of a pedal actuation, and for reducing the braking force again when at least one condition exists, wherein the control unit generates a signal for reducing the braking force when at least one of the following conditions exists:
        after a first specific time if a brake is released,
        after a second specific time if an accelerator pedal is actuated within the first specific time subsequent to a release of the brake,
        when a preselected time elapses after a master brake cylinder pressure falls below a preselected threshold value,
        when one of an anti-lock controller, a traction controller, and a driving dynamics controller is active, and
        if no gear is engaged when the brake pedal is released.

8. The device according to claim 7, wherein:
    the control unit generates the signal for reducing the braking force when the parking brake is released and the brake is released.

9. A device for controlling a braking system of a vehicle, comprising:
    a control unit for emitting least one output signal in at least one operating state while a brake pedal is actuated, the output signal maintaining a braking force at least one wheel of the vehicle, independently of a degree of a pedal actuation, and for reducing the braking force again when at least one condition exists, wherein the control unit generates an output signal for maintaining the braking force if at least one of the following conditions exists:
        a gear is engaged,
        at least one of an anti-lock controller, a traction controller, and a driving dynamics controller are not active,
        a road gradient in a start-off direction is detected as being positive, and
        an accelerator pedal is not actuated.

10. The method according to claim 1, further comprising the step of:
    refraining from performing the maintaining of the braking force in response to a detected downhill travel of the vehicle.

* * * * *